(12) United States Patent
Ahn et al.

(10) Patent No.: US 11,143,375 B2
(45) Date of Patent: Oct. 12, 2021

(54) SEQUENTIAL LIGHTING DEVICE OF LAMP FOR VEHICLE

(71) Applicants: Hyundai Motor Company, Seoul (KR); Kia Motors Corporation, Seoul (KR)

(72) Inventors: Byoung Suk Ahn, Gwacheon-si (KR); Seung Sik Han, Hwaseong-si (KR); Sung Ho Park, Seoul (KR); Ki Hong Lee, Seoul (KR); Jung Wook Lim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 16/996,619

(22) Filed: Aug. 18, 2020

(65) Prior Publication Data
US 2021/0270437 A1 Sep. 2, 2021

(30) Foreign Application Priority Data

Feb. 27, 2020 (KR) .................. 10-2020-0024375

(51) Int. Cl.
| *F21S 41/24* | (2018.01) |
| *F21S 41/29* | (2018.01) |
| *F21V 8/00* | (2006.01) |
| *F21S 43/237* | (2018.01) |
| *F21S 43/27* | (2018.01) |
| *F21S 43/245* | (2018.01) |
| *F21S 43/14* | (2018.01) |
| *F21Y 115/10* | (2016.01) |
| *F21S 41/148* | (2018.01) |

(52) U.S. Cl.
CPC .............. *F21S 41/24* (2018.01); *F21S 41/29* (2018.01); *F21S 43/237* (2018.01); *F21S 43/245* (2018.01); *F21S 43/27* (2018.01); *G02B 6/001* (2013.01); *F21S 41/148* (2018.01); *F21S 43/14* (2018.01); *F21Y 2115/10* (2016.08)

(58) Field of Classification Search
CPC .......... F21S 41/24; F21S 41/29; F21S 43/237; F21S 43/245; F21S 43/27; G02B 6/001
See application file for complete search history.

(56) References Cited

U.S. PATENT DOCUMENTS

| 4,924,357 A * | 5/1990 | Yamashita | ............. G02B 6/001 |
| | | | 355/67 |
| 6,550,952 B1 * | 4/2003 | Hulse | .................. G02B 6/0018 |
| | | | 362/555 |
| 2009/0237954 A1 * | 9/2009 | Goto | ..................... G02B 6/001 |
| | | | 362/551 |

FOREIGN PATENT DOCUMENTS

| DE | 19534410 C2 | 2/2000 |
| DE | 102011119230 A1 | 5/2013 |
| KR | 10-1998-0015487 A | 5/1998 |
| KR | 1020130090542 A | 8/2013 |
| KR | 1020160010964 A | 1/2016 |
| KR | 1020170080783 A | 7/2017 |

* cited by examiner

*Primary Examiner* — Thomas M Sember
(74) *Attorney, Agent, or Firm* — Morgan Lewis & Bockius LLP

(57) ABSTRACT

A sequential lighting device of a lamp for a vehicle, may implement sequential lighting with one light source, reducing the cost and simplifying the structure. Furthermore, the sequential lighting is implemented by the rotation of a light guide, forming a slim lamp form, and the smooth lighting feeling is implemented, improving merchantability.

16 Claims, 7 Drawing Sheets

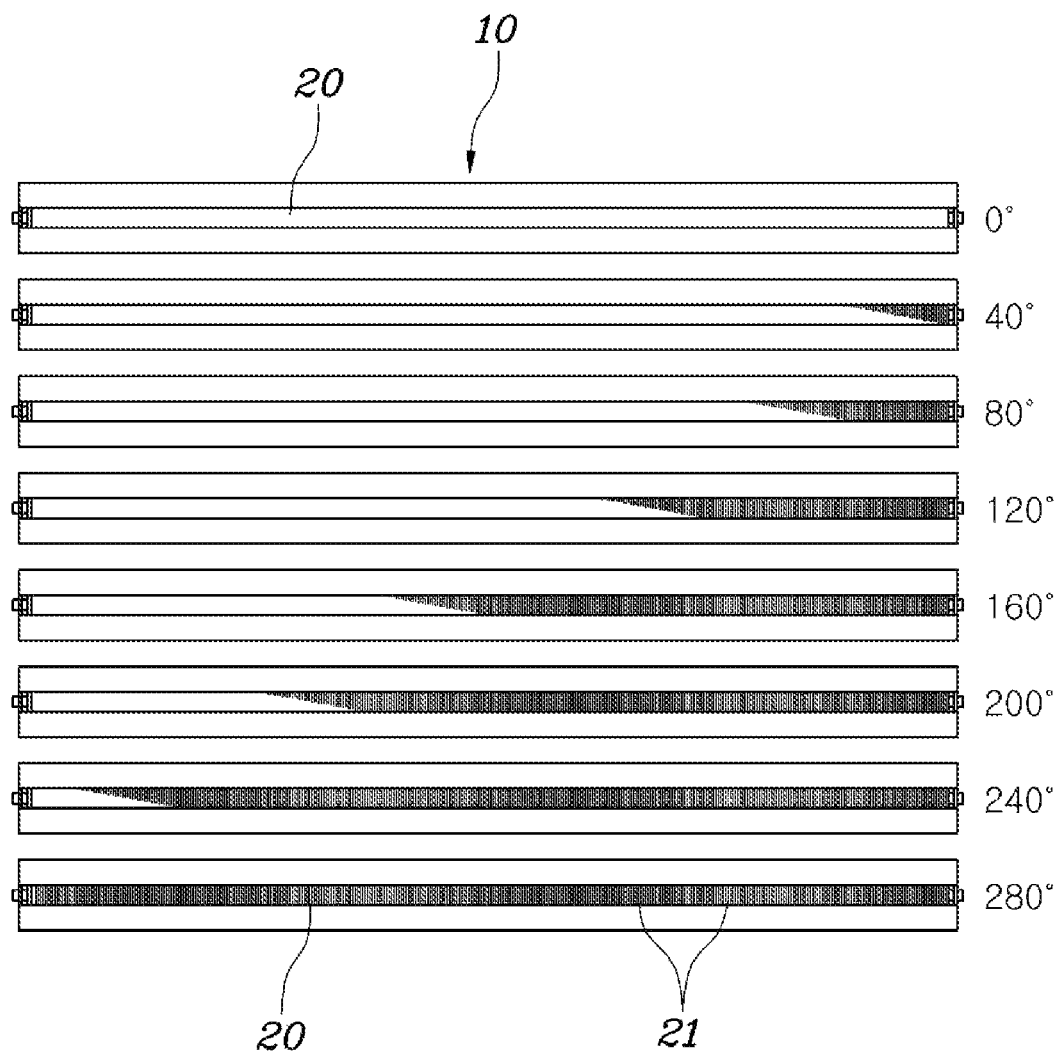

SEQUENTIAL LIGHTING DEVICE OF LAMP FOR VEHICLE

CROSS REFERENCE TO RELATED APPLICATION

The present application claims priority to Korean Patent Application No. 10-2020-0024375 filed on Feb. 27, 2020, the entire contents of which is incorporated herein for all purposes by this reference.

BACKGROUND OF THE DISCLOSURE

Field of the Disclosure

The present invention relates to a sequential lighting device of a lamp for a vehicle which enables the lamp of the vehicle to be sequentially lit.

Description of Related Art

Lamps utilizing various light sources are applied to a vehicle, and each lamp is suitably used based on the characteristics thereof according to the disposition location and application thereof.

Such a lamp includes an indoor lamp mounted in the vehicle, or a headlight, a fog lamp, a retreat lamp, a vehicle width lamp, a number lamp, a tail lamp, a brake lamp, a turn indicator lamp, an emergency flashing lamp, or the like mounted at the exterior of the vehicle.

Since the lamp mounted at the exterior of the vehicle also contributes to the high quality of the product in terms of design, the lamp design and lamp effect of the vehicle are also important.

Since the lamp mounted in the vehicle focuses on the light being radiated forward, the development of technology of securing the concentration and diffusivity of the light has been focused. Furthermore, to improve the design of the lamp, the shape around the lamp has been changed to improve the aesthetics.

However, the lamp is limited in attracting the attention of a consumer who purchases the vehicle. Accordingly, there is a demand for the lamp which may attract the consumer's attention through the lamp configured for securing the aesthetic appearance when the lamp mounted in the vehicle is lit.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a sequential lighting device of a lamp for a vehicle which improves the aesthetic appearance through a sequential lighting when a lamp radiating light to the outside of the vehicle is lit, improving merchantability.

A sequential lighting device of a lamp for a vehicle according to an exemplary embodiment of the present invention for achieving the object includes a housing which is formed to extend linearly, and has a light source radiating light provided at an end portion of the housing; and a light guide which is axial-rotatably mounted to the housing, formed to extend linearly in an axial direction of the housing, has an end portion mounted adjacent to the light source so that a light radiated from the light source is incident, and has an emission portion through which the light is emitted, the emission portion being formed on a circumferential surface of the light guide, and formed to extend from one side to the other side along the circumferential surface thereof, changing an emission position of the light according to a rotational position of the light guide.

The sequential lighting device of the lamp for the vehicle further includes a bezel which is formed to cover the light guide in a state in which the bezel is mounted to the housing, and has a light emission hole formed to extend linearly so that the light emitted from the light guide is emitted outward through the light emission hole.

The emission portion includes a plurality of optics which is formed to protrude outwardly from the circumferential surface of the light guide.

The light guide is cylindrically formed and the light radiated from the light source is totally reflected therein to be moved in the longitudinal direction thereof, and the light is emitted through the emission portion formed on the circumferential surface thereof.

The light guide is formed so that a reflectivity of the circumferential surface thereof is higher than a reflectivity of the emission portion.

The light guide has a fine notches formed on the circumferential surface thereof so that the light radiated from the light source is totally reflected therein.

The emission portion has a plurality of optics which is arranged spirally from one side to the other side along the rotation direction thereof.

The emission portion includes a sequential lighting section in which the plurality of optics is arranged spirally from one side to the other side along the rotation direction thereof, and an entire lighting section in which the plurality of optics is positioned adjacent to the other side of the sequential lighting section and arranged linearly.

The emission portion has a plurality of optics which is arranged to be gradually increased from one side toward the other side thereof.

The emission portion has the plurality of optics which are gradually increased from one side toward the other side and the plurality of optics is filled from one side to the other side of the light guide.

The light source in the housing is positioned at the other side of the light guide.

The housing further includes a projection lens which allows the light emitted from the light guide to be projected outward therethrough, and the projection lens extends linearly along an axial direction of the housing and is formed so that the length of the projection lens protruding in the emission direction of the light is gradually shorter or longer.

The sequential lighting device of the lamp for the vehicle including the aforementioned structure implements the sequential lighting with one light source, reducing the cost and simplifying the structure. Furthermore, the sequential lighting is implemented by the rotation of the light guide, forming the slim lamp form, and the smooth lighting feeling is implemented, improving the merchantability.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 10, FIG. 11, and FIG. 12 are diagrams for explaining various exemplary embodiments according to the sequential lighting.

Figure 1:
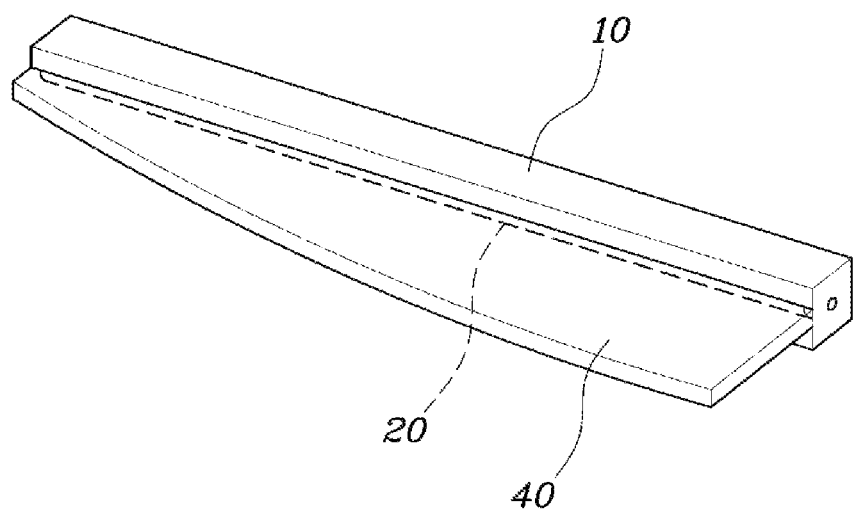
FIG. 1 is a diagram illustrating a sequential lighting device of a lamp for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a sequential lighting device of a lamp for a vehicle according to an exemplary embodiment of the present invention will be described with reference to the accompanying drawings.

Figure 2:
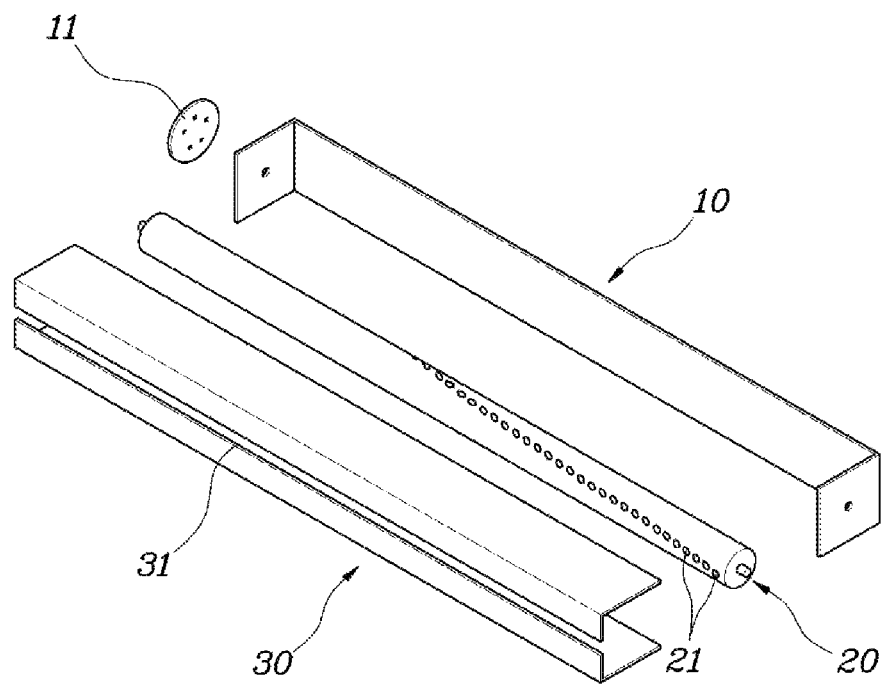
FIG. 2 is an assembling diagram of the sequential lighting device of the lamp for the vehicle illustrated in FIG. 1.
Figure 6:
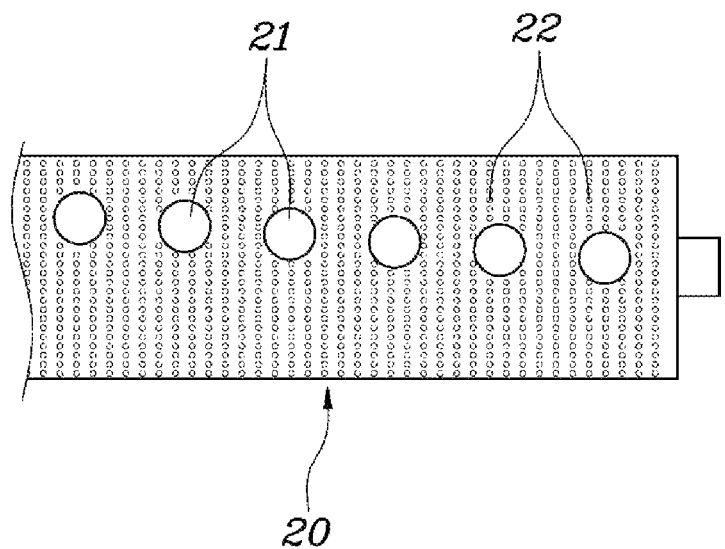
Figure 7:
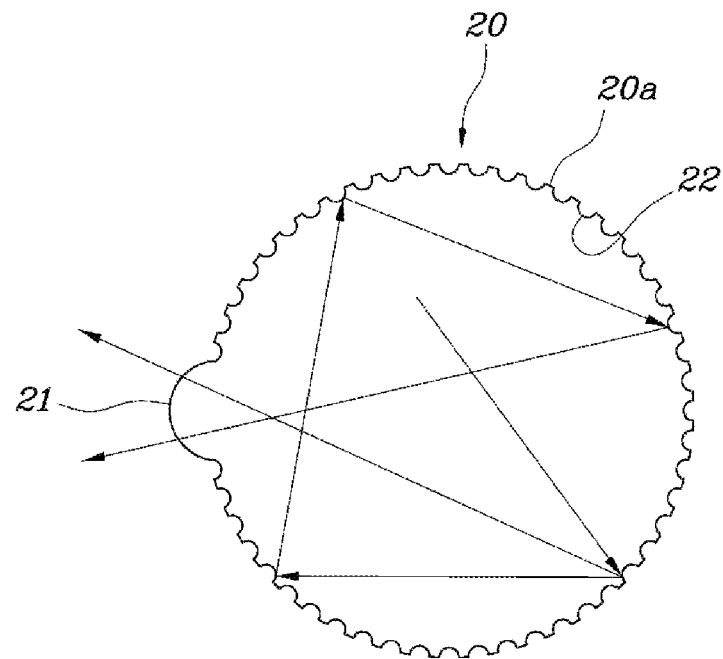
Figure 8:
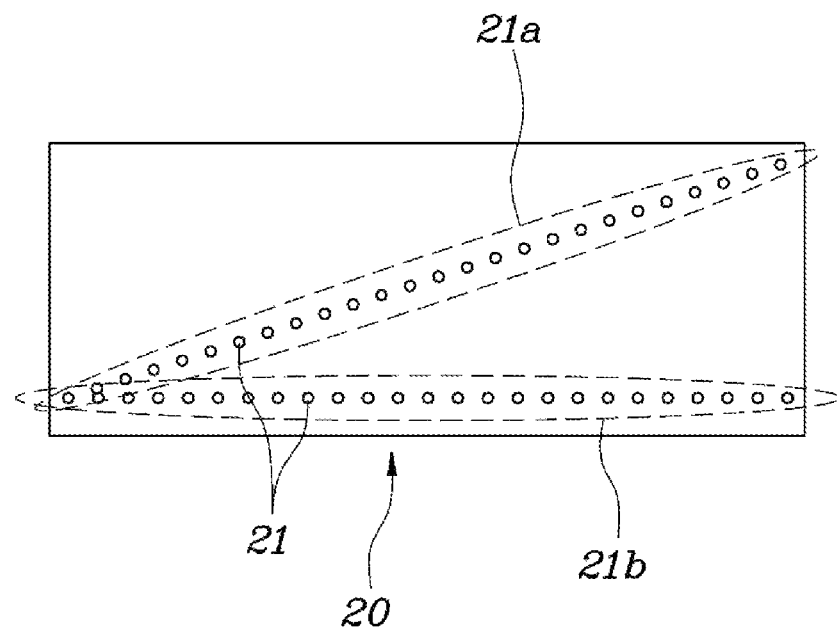
FIG. 8 and FIG. 9 are diagrams for explaining various exemplary embodiments according to the sequential lighting.
Figure 9:
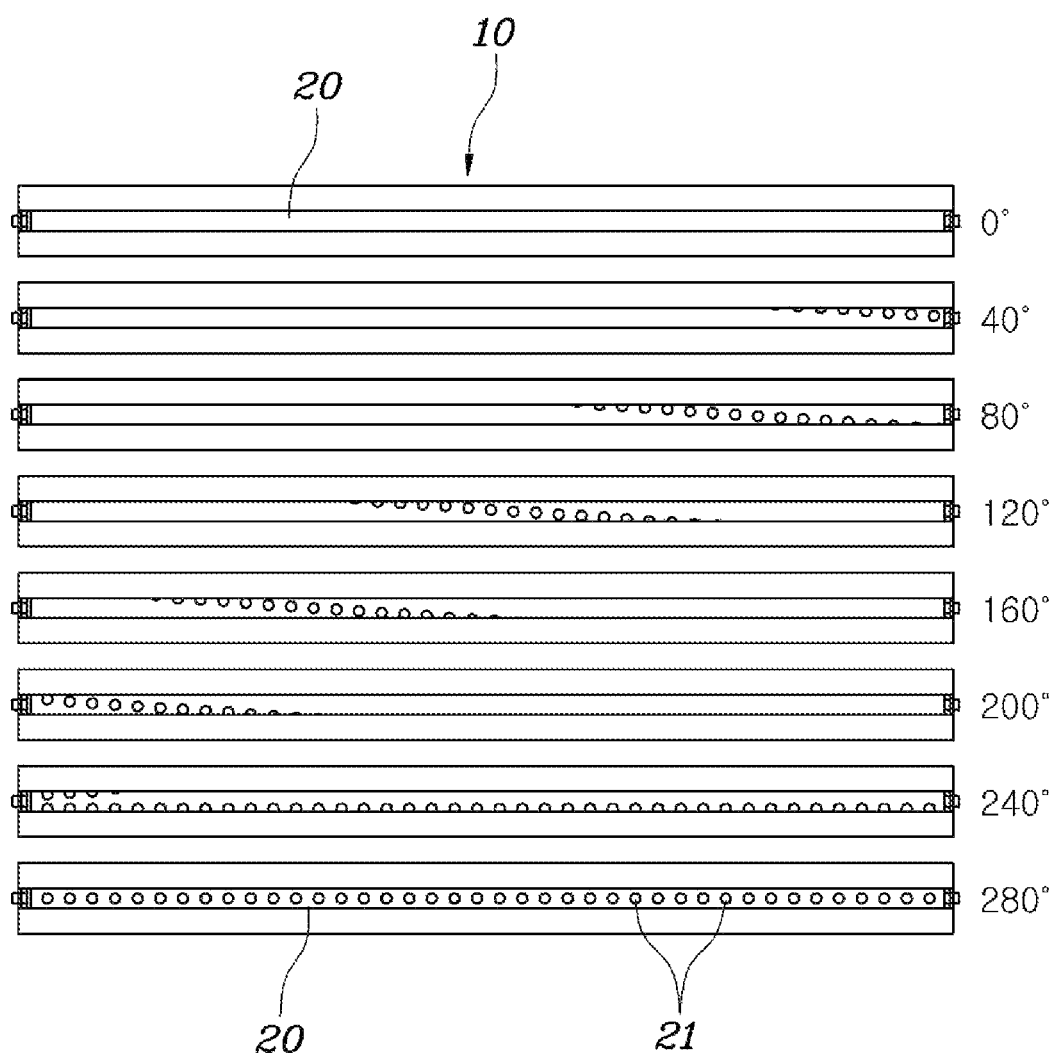
Figure 10:
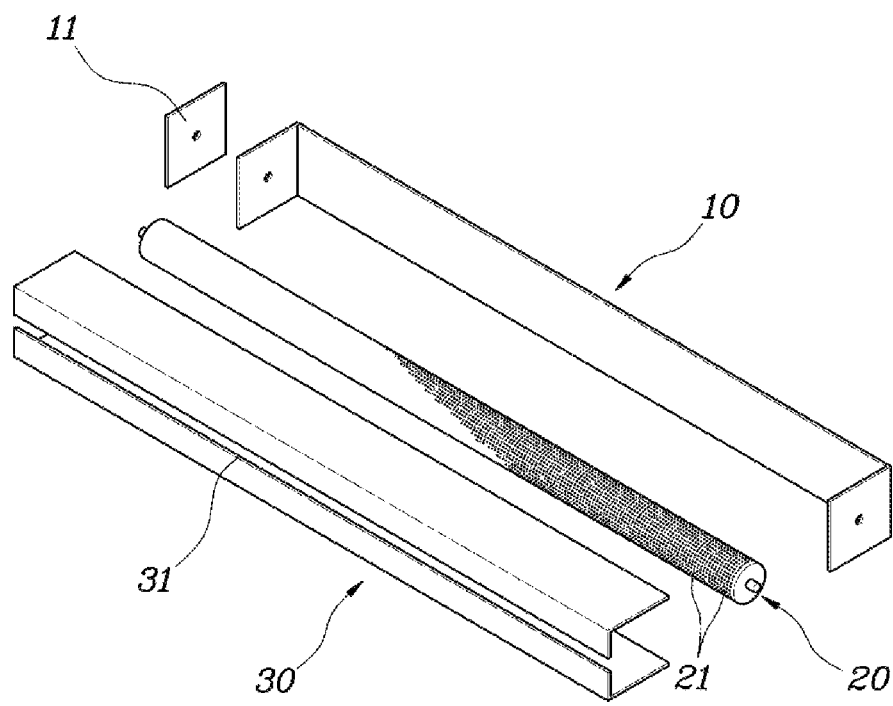
Figure 11:
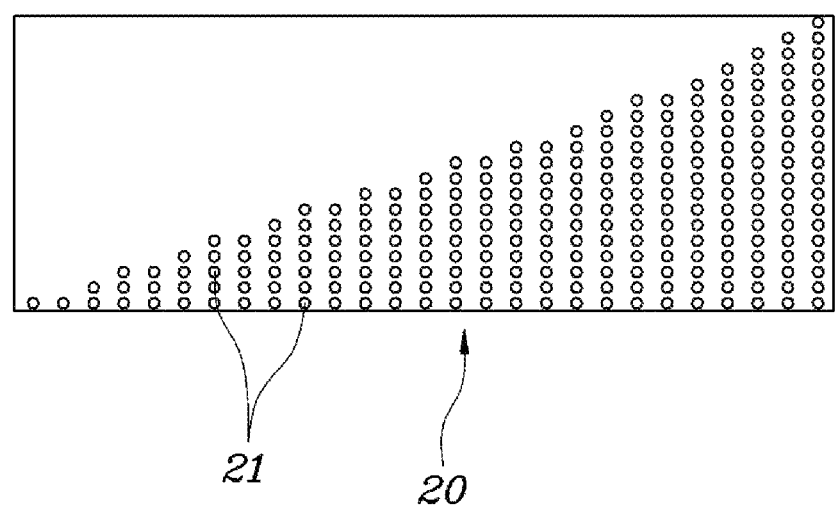

FIG. 1 is a diagram illustrating a sequential lighting device of a lamp for a vehicle according to an exemplary embodiment of the present invention, FIG. 2 is an assembling diagram of the sequential lighting device of the lamp for the vehicle illustrated in FIG. 1, FIG. 3, FIG. 4, FIG. 5, FIG. 6 and FIG. 7 are diagrams for explaining the sequential lighting device of the lamp for the vehicle illustrated in FIG. 1, FIG. 8 and FIG. 9 are diagrams for explaining various exemplary embodiments according to the sequential lighting, and FIG. 10, FIG. 11, and FIG. 12 are diagrams for explaining various exemplary embodiments according to the sequential lighting.

As illustrated in FIG. 1 and FIG. 2, a sequential lighting device of a lamp for a vehicle according to an exemplary embodiment of the present invention includes a housing 10 which is formed to extend linearly, and has a light source 11 for radiating light formed at an end portion thereof, and a light guide 20 which is axial-rotatably mounted to the housing 10, formed to extend linearly along an axial direction of the housing 10, has an end portion mounted adjacent to the light source 11 so that the light radiated from the light source 11 is incident, and includes an emission portion 21 through which the light is emitted, the emission portion 21 being formed on a circumferential surface 20a, and formed to extend from one side to the other side along the circumferential surface thereof, changing the emission position of the light according to the rotational position.

As described above, the present invention includes the light source 11 mounted to the housing 10 and the light guide 20, and the light source 11 is mounted to the end portion of the housing 10, and the light guide 20 is rotatably mounted to the housing 10 as a hinge structure and has the end portion mounted adjacent to the light source 11.

Figure 3:
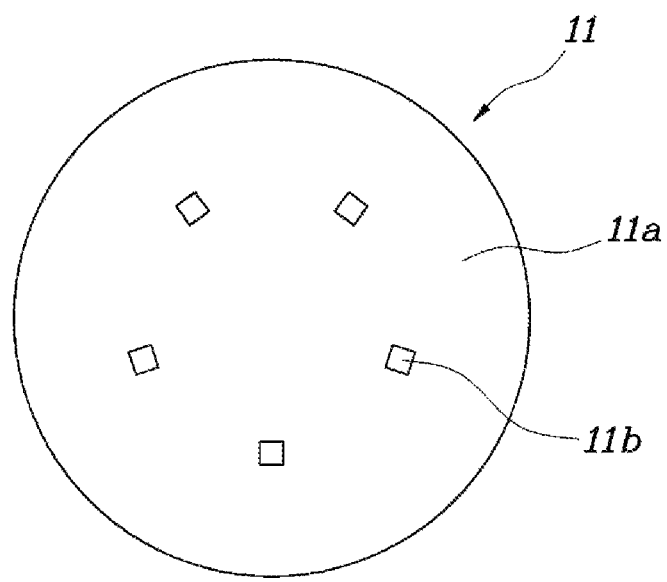
FIG. 3, FIG. 4, FIG. 5, FIG. 6 and FIG. 7 are diagrams for explaining the sequential lighting device of the lamp for the vehicle illustrated in FIG. 1.

As may be illustrated in FIG. 3, the light source 11 may include an LED 11b which is mounted on a substrate 11a, and a plurality of LEDs may be configured and mounted circularly along the circumferential direction of the light guide 20 so that the light radiated to the light guide 20 is evenly distributed.

Figure 4:
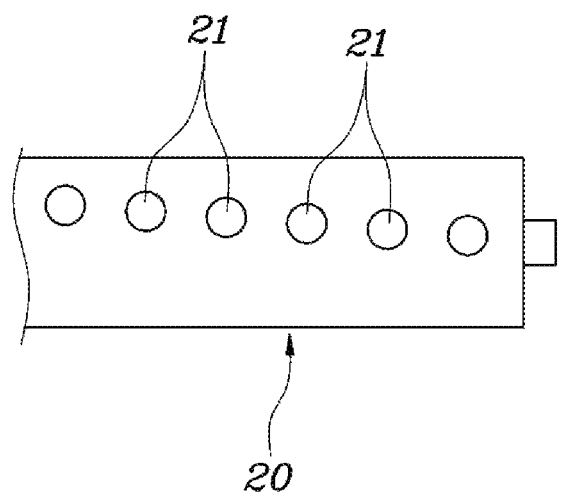
Figure 5:
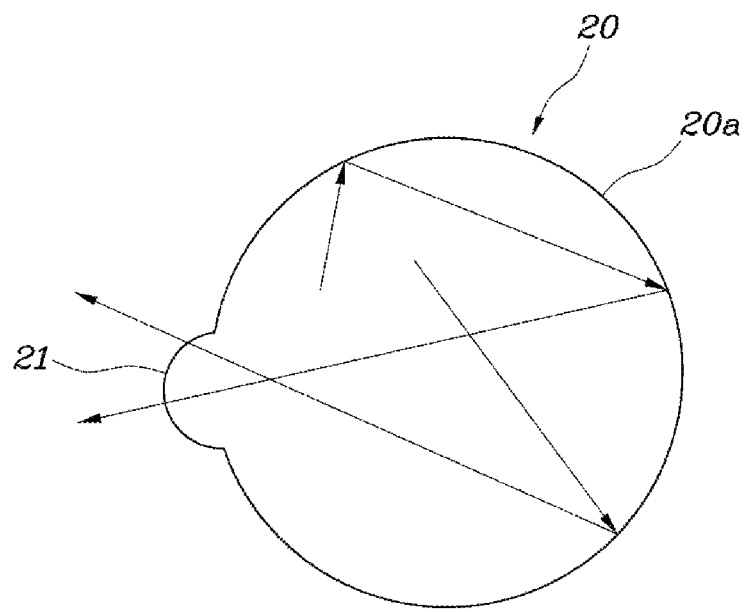

As illustrated in FIG. 4 and FIG. 5, the light guide 20 is formed in a cylindrical shape, and has the end portion mounted adjacent to the light source 11 such that the light radiated from the light source 11 may be incident inside, the light incident therein may be totally reflected to move in the longitudinal direction thereof, and the light may be emitted through the emission portion 21 formed on the circumferential surface thereof. As described above, as the light guide 20 is formed in the cylindrical shape, the incident light is totally reflected and moved therein, and is emitted outward through the emission portion 21 when the totally reflected light reaches the emission portion 21. Here, the emission portion 21 may be formed of a plurality of optics which is formed to protrude outwardly from the circumferential surface of the light guide 20. That is, due to a change in the surface shape by the shape of the optic in the light guide 20, the light may not be totally reflected and may be transmitted to be emitted outward at a position where the emission portion 21 is formed.

The light guide 20 is rotatably mounted to the housing 10, and the emission portion 21 is mounted to extend from one side to the other side along the circumferential surface thereof such that the emission position of the light through the emission portion 21 is changed according to the rotational position. Here, for rotation of the light guide 20, the housing 10 may be provided with a driver, and the light guide 20 may be rotated by a rotational force generated at operation of the driver. The driver may be a motor, and configured so that the light guide 20 is rotated in various methods such as a cam structure and a gear connection structure.

As described above, according to an exemplary embodiment of the present invention, when the light guide 20 rotates in the housing 10, the emission position of the light is changed as the position of the emission portion 21 is changed, implementing the sequential lighting effect.

Describing the aforementioned present invention, as illustrated in FIG. 2, the present invention may further include a bezel 30 which is formed to cover the light guide 20 when the bezel is mounted to the housing 10, and has a light emission hole 31 formed to extend linearly so that the light emitted from the light guide 20 is emitted outward through the light emission hole 31.

Here, the bezel 30 may include a material through which the light is not transmitted, and protects the light guide 20 from external impact by being formed to cover the light guide 20 when the bezel 30 is mounted to the housing 10.

Furthermore, the bezel 30 is formed with the light emission hole 31 extending linearly in the longitudinal direction of the light guide 20 such that the light emitted from the light guide 20 is emitted outward through the light emission hole 31. That is, the bezel 30 is configured so that when the emission portion 21 matches the light emission hole 31 of the bezel 30 as the light guide 20 is rotated, the light emitted through the emission portion 21 is emitted outward through the light emission hole 31 such that the light is emitted outward only at a position which matches the light emission hole 31 among the plurality of emission portions 21.

As described above, the light guide 20 is formed so that the emission portion 21 extends from one side to the other side along the circumferential surface thereof such that the plurality of emission portions 21 sequentially match the light emission hole 31 when the light guide 20 is rotated, implementing the sequential lighting effect.

Meanwhile, the light guide 20 is formed in the cylindrical shape so that the light radiated from the light source 11 is totally reflected therein to be moved in the longitudinal direction thereof, and the light may be emitted through the emission portion 21 formed on the circumferential surface thereof.

Here, the light guide 20 may be configured so that a reflectivity of the circumferential surface thereof is higher than a reflectivity of the emission portion 21. Accordingly, the light incident into the light guide 20 may be moved by being reflected on the circumferential surface having a high reflectivity, and emitted outward by being transmitted through the emission portion 21 having a low reflectivity. That is, the circumferential surface of the light guide 20 is subjected to high-reflection or half-mirror deposition or coating treatment to give a mirror effect so that the reflectivity is increased, and the emission portion 21 may not be subjected to the surface treatment to have a low reflectivity so that the light is transmitted smoothly.

Furthermore, as illustrated in FIG. 6 and FIG. 7, the light guide 20 may be formed with fine notches 22 on the circumferential surface thereof so that the light radiated from the light source 11 is totally reflected therein. That is, as the circumferential surface of the light guide 20 is formed to have the fine notches 22, the light incident into the light guide 20 may be diffused in all directions by the notch shape to smoothly move within the light guide 20.

The emission portion 21 and the fine notches 22 of the aforementioned light guide 20 may be changed in size and shape according to the light distribution of the required light.

Meanwhile, as an exemplary embodiment of the present invention, the emission portion 21 may have a plurality of optics which is arranged spirally from one side to the other side along the rotation direction thereof. That is, the emission portion 21 in the light guide 20 is a portion where the light is projected, and is arranged spirally from one side to the other side along the rotation direction thereof such that the position of the emission portion 21 may be changed sequentially in a direction in which the light is emitted upon rotation of the light guide 20, implementing the sequential lighting effect.

In an exemplary embodiment of the present invention, the notches 22 are formed to protrude inwards the circumferential surface of the light guide 20, and a radius of each optic in the emission portion 21 is larger than a radius of each notch 22.

As illustrated in FIG. 8, assuming that the light guide 20 is unfolded in a plan, the present forms an array in which the plurality of emission portions 21 extend diagonally from one side to the other side thereof. Accordingly, when the light guide 20 is formed in a cylindrical shape, the light emission portion 20 may form the spiral arrangement from one side to the other side, implementing the sequential lighting effect when the light guide 20 is rotated.

Furthermore, the emission portion 21 may include a sequential lighting section 21a in which the plurality of optics is arranged spirally from one side to the other side along the rotation direction thereof, and an entire lighting section 21b in which the plurality of optics is positioned adjacent to the other side of the sequential lighting section 21a and arranged linearly.

As illustrated in FIG. 8, the arrangement of the emission portion 21 in the light guide 20 may configure the sequential lighting section 21a and the entire lighting section 21b, implementing non-lighting, sequential lighting, and full lighting according to the rotational position of the light guide 20.

Referring to FIG. 9, assuming that the light is required to be emitted in a direction facing the drawing, the emission portion 21 is not matched with the emission direction in a case where the light guide 20 is in an initial non-rotational state, becoming a non-lighting state.

Thereafter, when the light guide 20 is rotated, the sequential lighting section 21a of the emission portion 21 matches the emission direction as the light guide 20 is rotated at the rotational angle of 40° to 240°. As described above, a position where the emission portion 21 is matched with the emission direction is switched, implementing the sequential lighting in the lighting pattern according to the rotational position of the light guide 20.

Meanwhile, in the position where the light guide 20 is rotated by 280°, the entire lighting section 21b of the emission portion 21 matches the emission direction thereof. Accordingly, the light is emitted in all regions of the light guide 20, implementing the full lighting.

Meanwhile, as another exemplary embodiment of the present invention, as illustrated in FIG. 10, FIG. 11, and FIG. 12, the emission portion 21 may have the plurality of optics which are arranged to be gradually increased from one side toward the other side thereof.

That is, as the emission portion 21 has the plurality of optics which are arranged to be gradually increased from one side to the other side of the light guide 20, the area of the emission portion 21 may be gradually increased in a direction in which the light is emitted when the light guide 20 is rotated, implementing the sequential lighting effect.

In an exemplary embodiment of the present invention, the emission portion 21 has the plurality of optics, a number of which is increased from the one side toward the other side and the plurality of optics is filled from the one side to the other side of the light guide 20.

As illustrated in FIG. 11, assuming that the light guide 20 is unfolded in a plan, the present forms the arrangement in which the plurality of optics gradually increase diagonally from one side to the other side thereof. Accordingly, when the light guide 20 is formed in a cylindrical shape, the emission portion 21 may be configured in a form which is gradually increased from one side to the other side on the circumferential surface thereof, implementing the sequential lighting effect when the light guide 20 is rotated.

Here, the emission portion 21 may have the plurality of optics which are gradually increased from one side toward the other side and the plurality of optics may be filled from one side to the other side of the light guide 20. Accordingly, the lamp implements non-lighting, sequential lighting, and full lighting according to the rotational position of the light guide 20.

As illustrated in FIG. 12, the emission portion 21 is not matched in the emission direction in a case where the light guide 20 is in an initial non-rotational state, becoming a non-lighting state.

Thereafter, when the light guide 20 is rotated, the optics of the emission portion 21 are gradually increased as the light guide 20 is rotated at the rotation angle of 40° to 240°. Accordingly, the area in which the emission portion 21 is matched in the emission direction is gradually increased, implementing the sequential lighting in the lighting pattern according to the rotational position of the light guide 20.

Meanwhile, in the position where the light guide 20 is rotated by 280°, all areas of the emission portion 21 are matched with the emission direction such that the light is emitted from all areas of the light guide 20, implementing the full lighting.

Meanwhile, the light source 11 in the housing 10 may be positioned at the other side of the light guide 20. That is, the emission portion 21 in the light guide 20 has a form of extending from one side to the other side such that when the light source 11 is positioned at one side of the light guide 20, the light is excessively concentrated at one side of the light guide 20 and thus the amount of light becomes unbalanced.

Accordingly, the light source 11 is mounted at the other side of the light guide 20 so that when the lamp is sequentially lit, the light emitted through the emission portion 21 maintains a similar amount of light and thus the lighting feeling is improved.

Meanwhile, the housing 10 further includes a projection lens 40 which allows light emitted from the light guide 20 to be projected outward, and the projection lens 40 may extend linearly along an axial direction of the housing 10 and may be formed so that the length of the projection lens 40 protruding in the emission direction of the light is gradually shorter or longer.

As illustrated in FIG. 1, the projection lens 40 may be formed to extend linearly, and may be formed so that the length of the projection lens 40 protruding in the direction in which the light is emitted is gradually shorter from one side to the other side thereof. As described above, as the projection lens 40 is formed to have a curved surface, a three-dimensional shape may be implemented. Furthermore, the emission portion 21 of the light guide 20 extends from one side to the other side, also improving the light distribution efficiency.

The sequential lighting device of the lamp for the vehicle configured as the aforementioned structure implements the sequential lighting with one light source 11, reducing the cost and simplifying the structure. Furthermore, the sequential lighting is implemented by the rotation of the light guide 20, forming the slim lamp form, and the smooth lighting feeling is implemented, improving the merchantability.

In an exemplary embodiment of the present invention, a controller is connected to the driver, to control the operations thereof.

In addition, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A sequential lighting device of a lamp, the device comprising:
   a housing which is formed to extend linearly in an axial direction of the housing, and has a light source provided at an end portion of the housing; and
   a light guide which is formed to extend linearly in the axial direction of the housing, and mounted to the housing in the axial direction of the housing, wherein the light guide is rotatable in a circumferential direction of the light guide,
   wherein the light guide includes:
      an end portion mounted adjacent to the light source so that a light radiated from the light source is incident; and
      an emission portion through which the light is emitted, the emission portion being formed on a circumferential surface of the light guide, and formed to extend from a first side to a second side along the circumferential surface, and changing an emission position of the light according to a rotational position of the light guide, and wherein the emission portion has a plurality of optics which is arranged spirally from the first side to the second side along a rotation direction of the light guide.

2. The sequential lighting device of the lamp according to claim 1, further including a bezel formed to cover the light guide in a state in which the bezel is mounted to the housing, wherein the bezel includes a light emission hole formed to extend linearly in an axial direction of the bezel so that the light emitted from the emission portion of the light guide is emitted outward through the light emission hole.

3. The sequential lighting device of the lamp according to claim 2,
wherein the housing further includes a projection lens coupled to the light emission hole of the bezel, and
wherein the projection lens allows the light emitted from the emission portion of the light guide to be projected outward therethrough.

4. The sequential lighting device of the lamp according to claim 3,
wherein a length of the projection lens protruding in an emission direction of the light from the light emission hole is not a same along the axial direction of the housing.

5. The sequential lighting device of the lamp according to claim 4,
wherein the length of the projection lens protruding in the emission direction of the light from the light emission hole is increased along the axial direction of the housing from the end portion to another end portion of the light guide.

6. The sequential lighting device of the lamp according to claim 1,
wherein the emission portion includes the plurality of optics which is formed to protrude outwardly from the circumferential surface of the light guide.

7. The sequential lighting device of the lamp according to claim 6,
wherein the light guide has notches formed on the circumferential surface of the light guide,
wherein the notches are formed to protrude inwards the circumferential surface of the light guide, and
wherein a radius of each optic in the emission portion is larger than a radius of each notch.

8. The sequential lighting device of the lamp according to claim 1,
wherein the light guide is cylindrically formed and the light radiated from the light source is reflected therein to be moved in a longitudinal direction of the light guide, and then the light is emitted through the emission portion formed on the circumferential surface.

9. The sequential lighting device of the lamp according to claim 1,
wherein the light guide is formed so that a reflectivity of the circumferential surface thereof is higher than a reflectivity of the emission portion.

10. The sequential lighting device of the lamp according to claim 1,
wherein the light guide has notches formed on the circumferential surface of the light guide so that the light radiated from the light source is reflected therein.

11. The sequential lighting device of the lamp according to claim 10,
wherein the notches are formed to protrude inwards the circumferential surface of the light guide.

12. The sequential lighting device of the lamp according to claim 1, wherein the emission portion includes:
a sequential lighting section in which the plurality of optics is arranged spirally from the first side to the second side along the rotation direction of the light guide; and
an entire lighting section in which the plurality of optics is positioned adjacent to a side of the sequential lighting section and arranged linearly.

13. The sequential lighting device of the lamp according to claim 1,
wherein the emission portion has a plurality of optics which is arranged to be increased from the first side toward the second side of the emission portion.

14. The sequential lighting device of the lamp according to claim 13,
wherein the emission portion has the plurality of optics, a number of which is increased from the first side toward the second side and the plurality of optics is filled from the first side to the second side of the light guide.

15. The sequential lighting device of the lamp according to claim 1,
wherein the light source in the housing is positioned at the second side of the light guide.

16. The sequential lighting device of the lamp according to claim 1,
wherein the housing further includes a projection lens which allows the light emitted from the light guide to be projected outward therethrough, and the projection lens extends linearly along an axial direction of the housing and is formed so that a length of the projection lens protruding in an emission direction of the light from the light guide is not a same along the axial direction of the housing.

* * * * *